(12) United States Patent
Laskowski et al.

(10) Patent No.: US 7,511,243 B2
(45) Date of Patent: Mar. 31, 2009

(54) POWER SWITCH COMPRISING AN INTERRUPTER UNIT DISPOSED WITHIN AN ENCAPSULATING HOUSING

(75) Inventors: Karsten Laskowski, Berlin (DE); Christoph Sorowski, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 111 days.

(21) Appl. No.: 11/629,932

(22) PCT Filed: May 13, 2005

(86) PCT No.: PCT/DE2005/000916

§ 371 (c)(1),
(2), (4) Date: Dec. 18, 2006

(87) PCT Pub. No.: WO2005/124955

PCT Pub. Date: Dec. 29, 2005

(65) Prior Publication Data

US 2008/0042786 A1    Feb. 21, 2008

(30) Foreign Application Priority Data

Jun. 16, 2004    (DE) .................. 10 2004 029 871

(51) Int. Cl.
| | |
|---|---|
| H01H 9/40 | (2006.01) |
| H01H 9/38 | (2006.01) |
| H01H 3/00 | (2006.01) |
| H01H 33/02 | (2006.01) |
| H01H 33/34 | (2006.01) |
| H01H 33/14 | (2006.01) |
| H01H 33/12 | (2006.01) |
| H01H 33/66 | (2006.01) |

(52) U.S. Cl. ................ 218/7; 218/14; 218/154
(58) Field of Classification Search .............. 218/7, 218/14, 154
See application file for complete search history.

(56) References Cited

U.S. PATENT DOCUMENTS

| 3,857,006 | A | | 12/1974 | Daimon et al. |
| 4,268,890 | A | | 5/1981 | Silbermann |
| 4,434,335 | A | * | 2/1984 | Natsui et al. .......... 218/83 |
| 5,796,060 | A | * | 8/1998 | Fuchsle et al. ........ 218/79 |

(Continued)

FOREIGN PATENT DOCUMENTS

DE    27 21 258    11/1978

(Continued)

*Primary Examiner*—Elvin G Enad
*Assistant Examiner*—Alexander Talpalatskiy
(74) *Attorney, Agent, or Firm*—Laurence A. Greenberg; Werner H. Stemer; Ralph E. Locher (57) ABSTRACT

A circuit breaker has an interrupter unit, which is disposed within an encapsulating housing, and has a first contact piece and a second contact piece. The contact pieces can move in relation to one another and they are arranged axially opposite one another. The device further has a first current path section for supplying an electrical current to the first contact piece and a second current path section for supplying an electrical current to the second contact piece. The current path sections are part of the interrupter unit, and at least one of the current path sections has a connection contact and can move in relation to a stationary mating contact. The current path section can move by way of a drive device when the encapsulating housing is closed.

8 Claims, 5 Drawing Sheets

U.S. PATENT DOCUMENTS

| | | |
|---|---|---|
| 5,872,346 A | 2/1999 | Meinherz et al. |
| 6,175,167 B1 * | 1/2001 | Lorenz et al. ............... 307/125 |
| 6,342,685 B1 * | 1/2002 | Perret .......................... 218/78 |
| 6,437,273 B2 * | 8/2002 | Stechbarth et al. ............. 218/3 |
| 6,538,224 B2 * | 3/2003 | Furuta et al. ................. 218/43 |
| 6,545,241 B1 * | 4/2003 | Franchi et al. ................ 218/78 |
| 6,573,469 B1 * | 6/2003 | Piazza .......................... 218/7 |
| 6,593,538 B2 * | 7/2003 | Perret et al. .................... 218/3 |
| 6,660,955 B1 * | 12/2003 | Bues .......................... 218/79 |
| 6,680,453 B2 * | 1/2004 | Rokunohe et al. ............. 218/2 |
| 6,683,267 B1 * | 1/2004 | Piazza et al. ................... 218/2 |
| 6,693,250 B2 * | 2/2004 | Matsushita et al. ............. 218/3 |
| 6,784,392 B1 * | 8/2004 | Piazza et al. ................... 218/7 |
| 6,849,819 B2 * | 2/2005 | Tresy et al. .................... 218/3 |

FOREIGN PATENT DOCUMENTS

| | | |
|---|---|---|
| DE | 44 38 776 C1 | 4/1996 |
| DE | 44 45 172 C2 | 6/1996 |
| DE | 196 06 213 A1 | 2/1997 |
| DE | 196 13 750 A1 | 10/1997 |
| EP | 0 005 209 A1 | 11/1979 |
| EP | 0 593 902 A1 | 4/1994 |
| EP | 0 893 811 A2 | 1/1999 |
| EP | 1 020 970 A1 | 7/2000 |
| GB | 2 143 089 A | 1/1985 |

* cited by examiner

POWER SWITCH COMPRISING AN INTERRUPTER UNIT DISPOSED WITHIN AN ENCAPSULATING HOUSING

BACKGROUND OF THE INVENTION

Field of the Invention

The invention relates to a circuit breaker having an interrupter unit, which is arranged within an encapsulating housing and has a first contact piece and a second contact piece, wherein the contact pieces can move in relation to one another and are arranged axially opposite, as well as having a first current path section for supplying an electrical current to the first contact piece and a second current path section for supplying an electrical current to the second contact piece, wherein the current path sections are part of the interrupter unit, and at least one of the current path sections has a connection contact and can move in relation to a stationary mating contact.

Such a circuit breaker is known, for example, from the patent specification DE 44 38 776 C1. The circuit breaker therein is part of a metal-encapsulated electrical high-voltage switchgear assembly. Terminals for connecting two isolators are arranged at a first end of the circuit breaker therein. In order to make it possible for contact to be made between the high-voltage circuit breaker and the isolators in a simple manner, plug-in contacts are provided, of which one is in the form of a blade contact and the other is in the form of a bolt-shaped contact. When the interrupter unit is fitted, the interrupter unit is inserted into the encapsulating housing, and the blade contact or the bolt contact is closed as said unit is inserted. The construction of the contact pieces makes it possible for the circuit breaker to be fitted in a simple manner.

Once the circuit breaker has been fitted, the encapsulating housing is closed and filled with a gas at elevated pressure.

Isolators are necessary for connecting the circuit breaker optionally to different busbar sections or feed lines. In addition to the isolators themselves, space is required for the isolator drives.

SUMMARY OF THE INVENTION

The invention is based on the object of specifying a circuit breaker which, given small dimensions, can be connected in a simple manner to various busbar or line sections.

The object is achieved in the case of a circuit breaker of the type mentioned at the outset according to the invention by virtue of the fact that the current path section can move by means of a drive device when the encapsulating housing is closed.

Within a closed encapsulating housing, the interrupter unit of the circuit breaker is surrounded by an insulating gas, which is at elevated pressure, for example sulfur hexafluoride or nitrogen. This insulating gas makes it possible for large potential differences to be isolated at small distances. Owing to a movement at least of one of the current path sections, an isolating point can be formed between the connection contact and the mating contact. It is possible, by means of the drive, to repeatedly carry out the movement of the current path sections. Since it is now possible for isolating points to be produced within the encapsulating housing owing to the movement of the interrupter unit itself or of parts of the interrupter unit, isolators requiring additional physical volume can be dispensed with.

Advantageously, provision may further be made for the current path section to be mounted such that it can rotate.

Rotatable mounting of the current path sections makes it possible to move the connection contact on a circular path and thus to move it into and out of the mating contact. In this case, provision may be made for the contact pieces of the interrupter unit to likewise be capable of rotating with respect to one another. It is particularly advantageous if the contact pieces can be positioned in various positions with respect to one another. This makes more uniform wear on the contacts possible. Erosion points and wear on the contact pieces are distributed over a larger surface area.

Advantageously, provision may furthermore be made for the current path section to be axially displaceable.

Owing to the axial displaceability, the connection contact can be moved on a linear path into the mating contact. A combination of a rotary movement and an axial movement of the current path section makes it possible to produce a movement of the connection contact on a helical path. Such movements can be produced relatively easily owing to the superimposition of a rotary movement of the current path section with a simultaneous axial displacement.

One advantageous refinement may further provide for the interrupter unit to have a first current path section and a second current path section, wherein the two current path sections can move jointly.

A joint movement of two current path sections makes it possible to stick to the previous construction of an interrupter unit of a circuit breaker and to move this as a whole. The current path sections of an interrupter unit are in this case designed to be approximately tubular and are arranged in each case at the end in the axial direction of the interrupter unit. Provision may be made here for the current path sections to be designed to be mechanically robust such that they form a type of supporting frame or chassis, on which the further parts of the interrupter unit are fixed. It is thus possible, for example, for provision to be made for the current path sections to be arranged concentrically with respect to the contact pieces, wherein the contact pieces may be both rated current and arcing contact pieces. The current path sections in this case surround the contact system of the interrupter unit. The contact system of the interrupter unit may also have, in addition to the contact pieces, compression devices for producing a quenching gas flow, storage volumes for accommodating heated quenching gas, arcing chambers, within which an arc burns or else an insulating material nozzle, which is used for guidance and force transfer purposes between the two sides of the interrupter unit having the two current path sections. The current path sections surround the interrupter unit at the end and form the outer contour of the interrupter unit. In this case, the current path sections may be designed to be mechanically robust and can absorb supporting forces and/or act as a shielding element for an electrical field. The current path sections can also be referred to as contact carriers, which hold and support the actual contact system and are used for supplying electrical current to this system.

Furthermore, provision may advantageously be made for the interrupter unit to have a first current path section and a second current path section, wherein the two current path sections can move independently of one another.

An independent movement of the two current path sections is particularly advantageous when each of the current path sections has at least one connection contact associated with it. This makes it possible to form different circuit variants independently of one another. It is thus possible, for example, to implement independent connection or isolation of two busbar systems. For this purpose, it is merely necessary to provide a connection contact on the first current path section and a connection contact on the second current path section. By means of the two connection contacts, it is possible in each case to drive an outgoing feeder to the first or to the second busbar. Since this driving can take place in a detached manner, owing to the independent movability of the current path sections, the selection of the respective busbars can be performed as desired. In this case, provision may also be made for the connection contacts or the mating contacts to be designed such that an interruption-free changeover from the first busbar to the second busbar, and vice versa, can be carried out. Power switching of the cross-coupling can be carried out by the interrupter unit of the circuit breaker.

Furthermore, provision may advantageously be made for the axis of rotation of a current path section, which is mounted such that it can rotate, to run approximately parallel to the axial direction of the mutually opposite contact pieces.

The interrupter units of circuit breakers have a substantially elongate, tubular outer contour. The contact pieces are also aligned in the axial direction of the rounded-off outer contour. The rotatable mounting approximately parallel to the axial direction of mutually opposite contact pieces makes it possible for the interrupter unit to rotate in a very small area. Furthermore, it is easily possible, with such an alignment of the axis of rotation, for a drive movement to be transferred to the contact pieces, which can move in relation to one another, from the outside. Owing to the substantially coaxial design of the interrupter unit and of a drive rod, which is also arranged coaxially with respect thereto, it is possible to transfer a switching movement towards the interrupter unit, for example by means of a rotary coupling in the drive rod.

One further advantageous refinement may provide for the connection contact to be a moving contact element of an isolating device and/or of a grounding switching device.

Isolating devices are required for providing additional isolating points within an electrical conductor. This ensures that, in the event of failure or malfunctioning of a circuit breaker, a conductor path is not produced again in an undesirable manner. Isolated sections can be grounded via a grounding switching device. Further protection is therefore provided in the case of faulty operation or in the case of a fault in an electrical switching device. The arrangement of moving contact elements on the current path sections or on one of the current path sections allows for a connection of previously separate circuit breakers and isolators. A very compact switchpanel arrangement can thus be produced. This may have a modular design since all the required power switching contacts, isolating contacts or grounding contacts are arranged within the gas area of the interrupter unit.

One further advantageous refinement may provide for it to be possible for the relative movement of the first and the second contact piece and the movement of the current path section(s) to be produced by a common drive device.

The relative movement between the first and the second contact piece is produced, for example, by means of a switching rod, which is arranged coaxially with respect to the contact pieces. Via the switching rod, at least one of the contact pieces is connected to a drive arranged outside the encapsulating housing. Provision can thus be made, for example, for, in the event of a disconnecting movement of the circuit breaker once the end position of the contact pieces has been reached, a further movement to take place by the drive rod in the disconnecting direction, with the result that an axial displacement of the interrupter unit or else only of one of the current path sections of the interrupter unit is produced. In a connection process, this principle is reversed, with the result that, first, the current path section or the interrupter unit is displaced into its power switching position and then the contact pieces are connected by a continuation of the axial movement of the switching rod. In addition, the axial movement of the switching rod can be superimposed by a rotary movement, as a result of which, independently of one another or combined with one another, a rotary movement and a drive movement can be produced by a common drive device.

One further advantageous refinement may provide for the axial distance between the first and the second current path section to be approximately constant.

A virtually constant axial distance between the first and the second current path section is provided, for example, when the two current path sections are always moved in the same way. This is the case, for example, when an interrupter unit with a conventional construction of a circuit breaker is mounted such that it is axially displaceable and/or such that it can rotate.

Advantageously, provision may also be made for the axial distance between the first and the second current path section to be variable.

The axial distance between the first and the second current path section is variable when the two current path sections can move independently of one another. In this case, provision may be made, for example, for the current path sections of the interrupter unit to be mounted independently of one another and also to be capable of moving independently of one another. Separate displaceability of the current path sections can take place, for example, by virtue of the fact that each of the current path sections can be driven independently, mutual guidance taking place via insulating elements, for example an insulating material nozzle, which is arranged coaxially with respect to the arcing contact pieces. It is also possible for other components to be provided for guiding the current path sections. For example, the switching chamber of the interrupter unit can also be used for this purpose. Alternatively, however, it is also possible to dispense with mutual support/guidance of the current path sections entirely. In this case, each of the current path sections is mounted and guided independently of one another at the end. As a result, a free gas path can be formed between the halves of the interrupter unit, which gas path can fulfill an additional isolator function.

In the text which follows, the invention will be illustrated schematically in a drawing and described in more detail below with reference to an exemplary embodiment.

DESCRIPTION OF THE PREFERRED EMBODIMENTS

Figure 1:
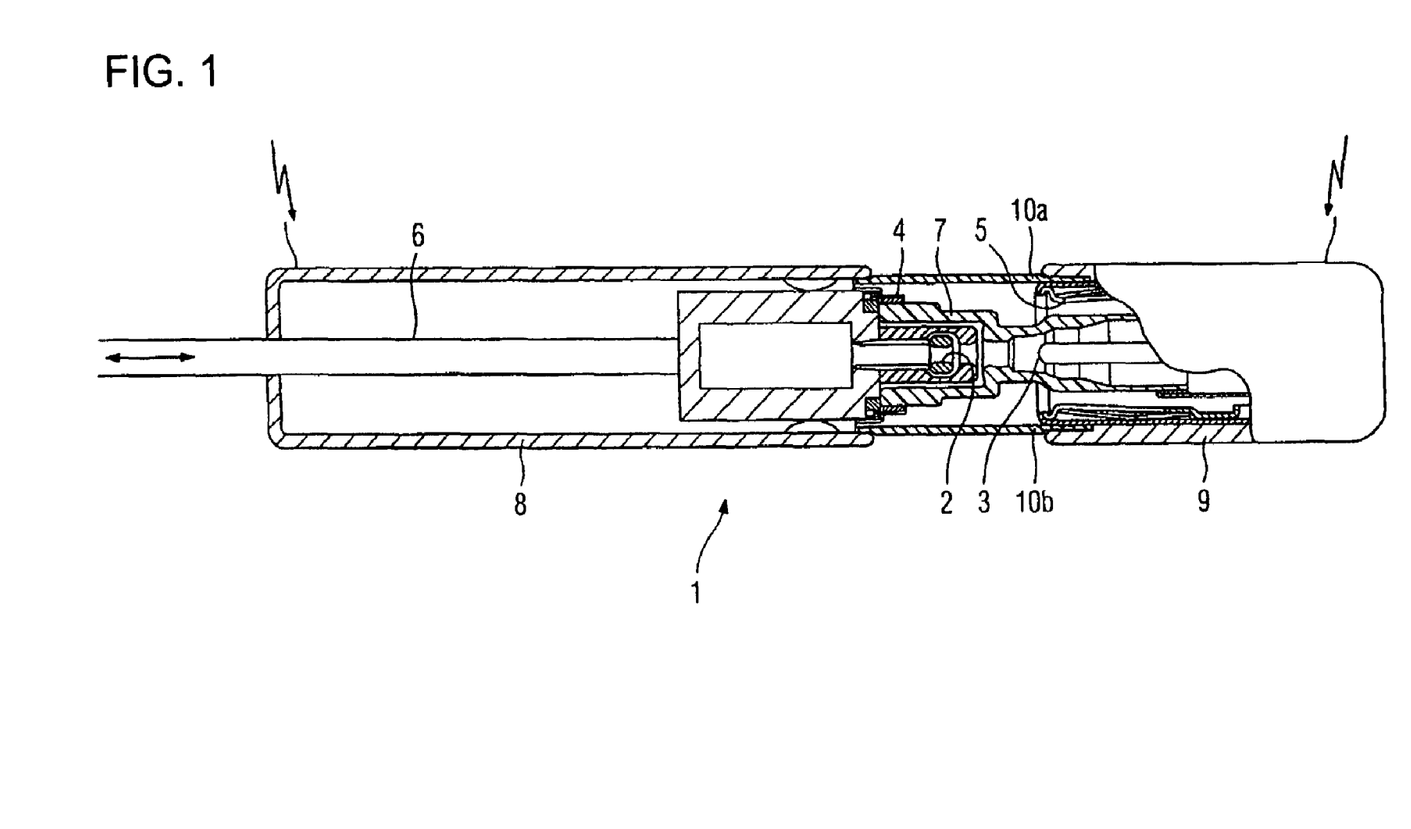
FIG. 1 shows a section through a schematic illustration of an interrupter unit.

The interrupter unit 1, illustrated in FIG. 1, of a circuit breaker has a first contact piece 2 and a second contact piece 3. The two contact pieces 2, 3 are in the form of arcing contact pieces and are arranged axially opposite one another. The first contact piece 2 is in the form of a tulip contact, and the second contact piece 3 is in the form of a bolt-shaped contact piece. A first rated current contact piece 4 is arranged concentrically with respect to the first contact piece 2. Furthermore, a second rated current contact piece 5 is arranged concentrically with respect to the second contact piece 3. A movement of a drive (not illustrated in FIG. 1) can be transferred to the first contact piece 2 and the first rated current contact piece 4 via a drive rod 6. An insulating material nozzle 7 is arranged coaxially with respect to the first contact piece 2. The insulating material nozzle 7 surrounds the first contact piece 2 and the second contact piece 3. The insulating material nozzle 7 itself is surrounded by the first rated current contact piece 4 and the second rated current contact piece 5. The insulating material nozzle 7 is fixedly connected to the first rated current contact piece 4 and the first contact piece 2. The insulating material nozzle 7 protrudes with its free end in the direction of the second contact piece 3 and of the second rated current contact piece 5 and is mounted there such that it can slide in order to prevent oscillations. Alternatively, it is also possible to envisage that the insulating material nozzle 7 protrudes unsupported in the direction of the second contact piece 3 and of the second rated current contact piece 5, with no sliding mounting. If appropriate, it is also possible to dispense with the use of an insulating material nozzle 7. The interrupter unit 1 also has a first current path section 8 and a second current path section 9. The current path sections 8, 9 are substantially tubular and surround the contact system so as to produce a dielectrically advantageous outer contour of the interrupter unit. Alternatively, provision may also be made for the first current path section 8 and the second current path section 9 to be formed, for example, from the first rated current contact piece 4 and the second rated current contact piece 5. In order to keep the distance between the current path sections 8, 9 constant and to position the sections, which can move in relation to one another, the two current path sections 8, 9 are connected to one another at a fixed angle by means of insulating rods 10a,b. The interrupter unit illustrated in FIG. 1 may be arranged, for example, with one pole and in an insulated manner within an encapsulating housing. Alternatively, a plurality of these interrupter units can also be arranged within a common encapsulating housing.

Figure 2:
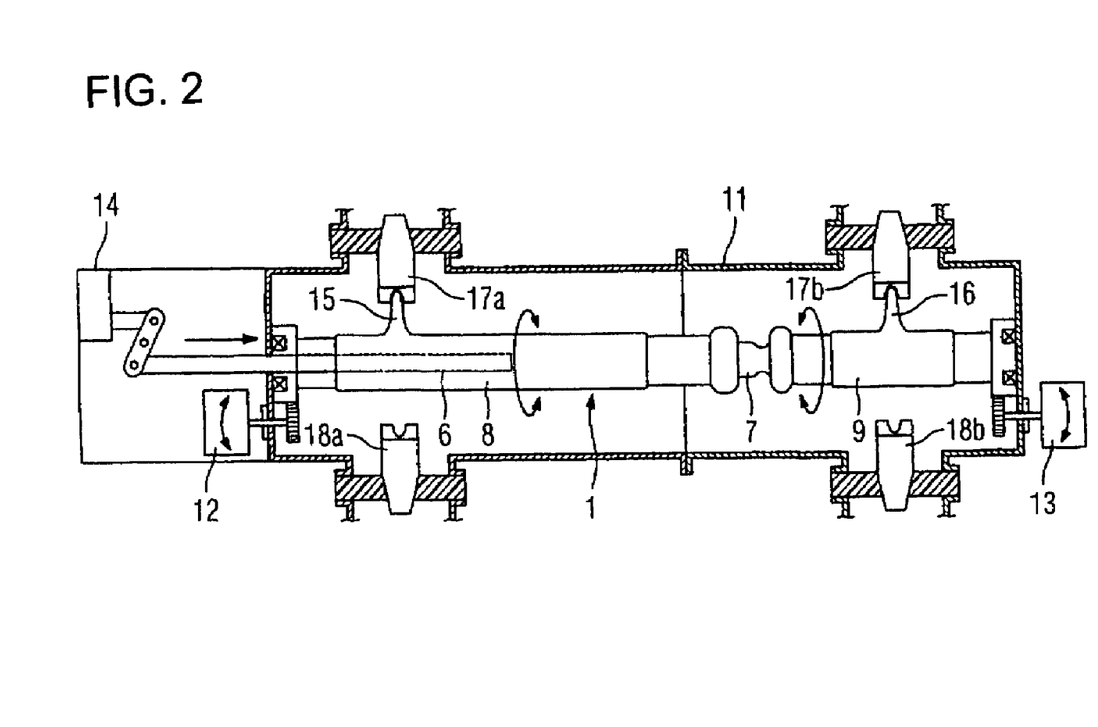
FIG. 2 shows a section through a circuit breaker having an interrupter unit fitted.

FIG. 2 illustrates the interrupter unit 1 installed in an encapsulating housing 11. The figure shows the first current path section 8 and the second current path section 9 and part of the insulating material nozzle 7. Assemblies provided with the same functions are provided with the same reference numerals in the figures. As a deviation from the interrupter unit illustrated in FIG. 1, coupling of the current path sections 8, 9 by means of insulating rods 10a,b has been dispensed with. This makes it possible for the two current path sections 8, 9 to rotate independently of one another. The two halves of the interrupter unit 1 are stabilized and supported via the insulating material nozzle 7. The interrupter unit 1 is arranged within the encapsulating housing 11 in a manner in which it is mounted such that it can rotate. The axis of rotation in this case runs through the contact pieces, which are positioned axially opposite one another. A rotary movement of a first drive device 12 is coupled into the interior of the housing via a transmission. By means of the first drive device 12, the first current path section 8 can be rotated when the encapsulating housing 11 is closed. Likewise, the second current path section 9 can be rotated in the interior of the encapsulating housing 11 via a second drive device 13 and a transmission arrangement. By means of a third drive device 14, an axial movement can be transferred at least to the first contact piece 2 and the first rated current contact piece 4 via a drive rod 6. A relative movement between the first contact piece 2 and the second contact piece 3 can thus be produced.

A first connection contact 15 is arranged on the first current path section 8, and a second connection contact 16 is arranged on the second current path section 9. The connection contacts 15, 16 protrude radially outwards from the axial direction of the interrupter unit 1 (see cross-sectional illustration). Each of the connection contacts 15, 16 has a stationary first mating contact 17a,b and a stationary second mating contact 18a,b associated with it. For example, busbars, electrical lines, outdoor bushings or similar devices for supplying an electrical current can be connected to the stationary mating contacts 17a,b; 18a,b. The current can be transmitted through the encapsulating housing 11, which is manufactured from electrically conductive material, via electrically insulating regions. A ground potential is applied to the encapsulating housing 11. As can be seen from the cross-sectional illustration in FIG. 2, the stationary mating contacts 17a,b; 18a,b are in the form of elastically deformable slot-shaped contacts, with the result that, in the event of a rotation of the interrupter unit 1 or of the first current path section 8 and/or of the second current path section 9, the connection contacts 15, 16, which are in the form of blade contacts, can be moved into the mating contacts 17a,b; 18a,b. It is also possible for the blade contacts and mating contacts to be replaced by one another or else for other forms of contacts to be used. In addition, provision may be made for grounding contacts 19a,b to be connected to the grounded encapsulating housing 11. The grounding contacts 19a,b, when the connection contacts 15, 16 are moved in, allow for the first current path section 8 and the second current path section 9 to be grounded. In the case of a, for example, sector-shaped design of the connection contacts 15, 16 and in the case of a corresponding arrangement of the mating contacts, it is furthermore possible to carry out an interruption-free changeover from one mating contact to another mating contact. This is particularly advantageous when an interruption-free busbar replacement needs to be carried out. Owing to the first and second drive device 12, 13, which operate independently of one another, the two current path sections 8, 9, which each belong to one half of the contact system and are each electrically conductively connected to this half, can move independently of one another.

Figure 3:
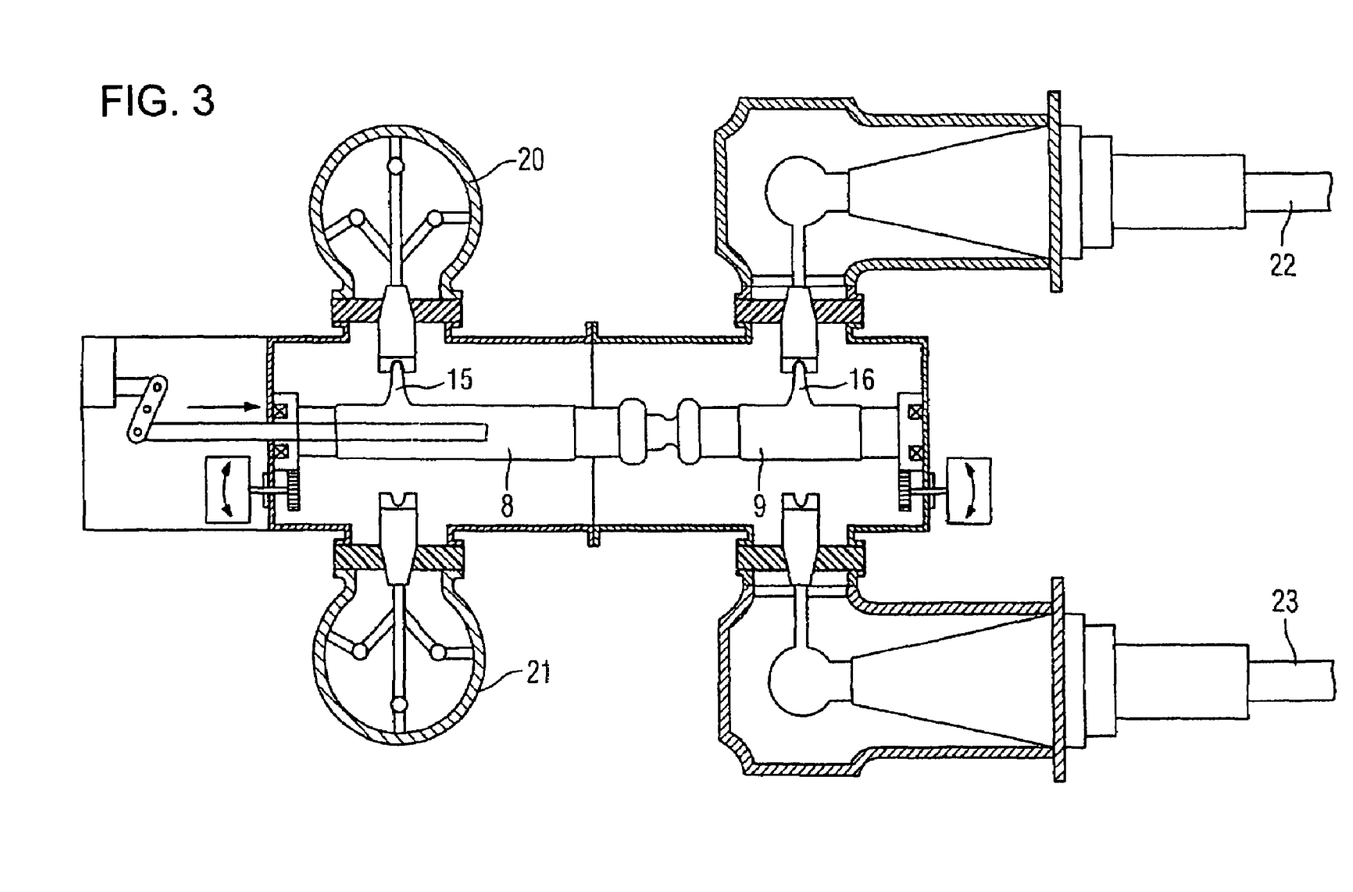
FIG. 3 shows a section through an application of the circuit breaker in a gas-insulated switchgear assembly.

FIG. 3 shows an application of the interrupter unit known from FIG. 2. A first busbar 20 and a second busbar 21 are flange-connected to the circuit breaker. It is possible to make contact alternatively with the first busbar 20 or the second busbar 21 via the first connection contact 15. It is possible to connect alternatively a first cable 22 and a second cable 23 via the second connection contact 16. Optionally, it is now possible to supply the first busbar 20 or the second busbar 21 via the first cable 22 or the second cable 23. The respective incoming cable feeder or outgoing busbar feeder can in this case be connected via the interrupter unit. Instead of the cables, other terminals such as, for example, an outdoor bushing, transformer terminals etc. can also be used.

Figure 4:
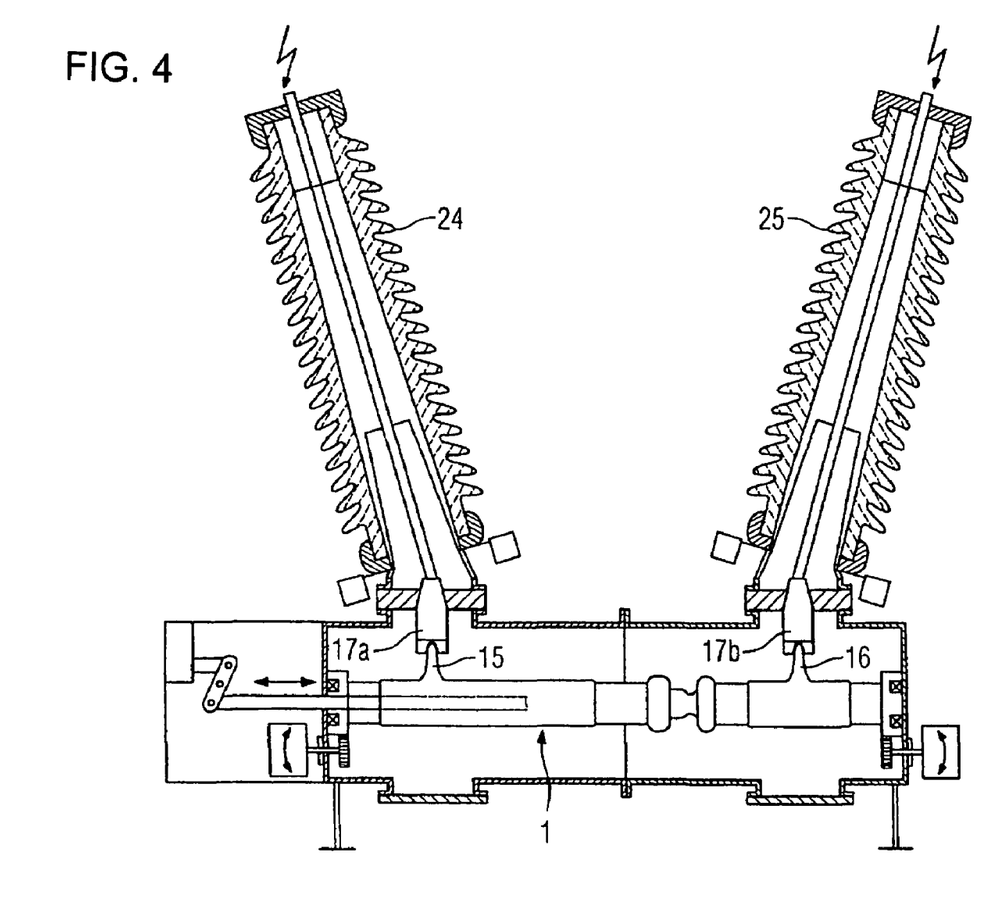
FIG. 4 shows an application of the circuit breaker in an embodiment outdoors.

FIG. 4 shows a modification of the circuit breaker arrangement shown in FIG. 3. In FIG. 4, the known circuit breaker is in the form of a dead tank circuit breaker. A first outdoor bushing 24 and a second outdoor bushing 25 are flange-connected to the first mating contacts 17a,b. For example, overhead lines can easily be connected to the interrupter unit 1 via the outdoor bushings 24, 25. Isolating points can be formed to the outdoor bushings 24, 25 by means of the first connection contact 15 and the second connection contact 16. Given corresponding wiring, for example, for making electrical contact between the first connection contact 15 and the mating contact 17a and the closed contact system of the interrupter unit, the second connection contact 16 can be moved into a grounding point. This makes it possible to ground a conductor path to the circuit breaker.

Figure 5:
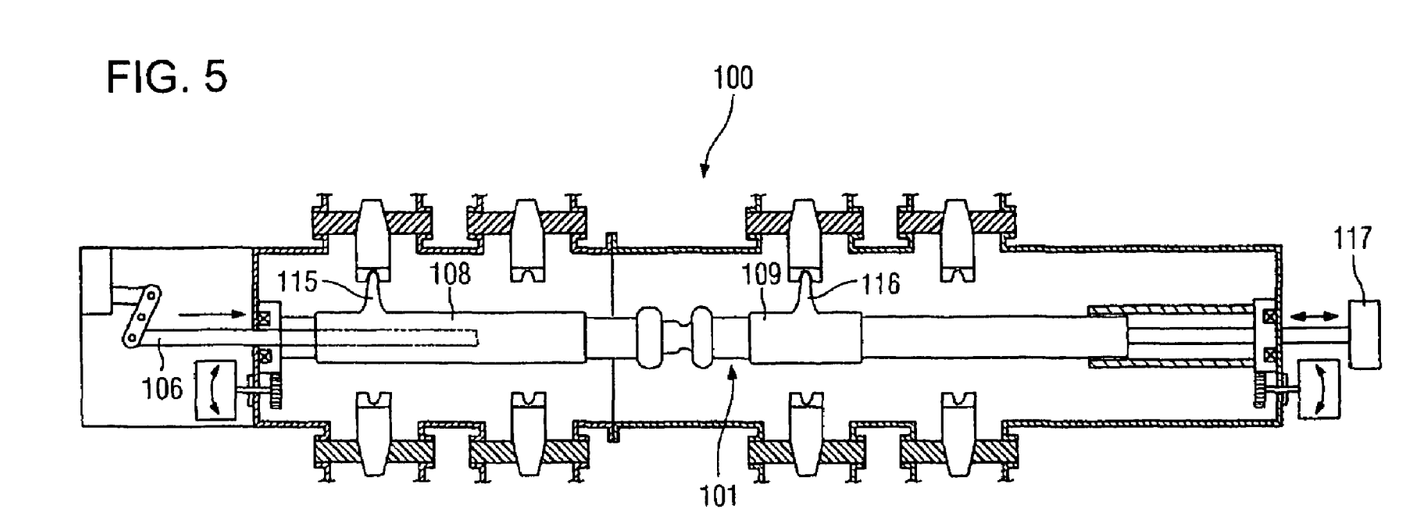
FIG. 5 shows a refinement variant of a circuit breaker having an interrupter unit, which is mounted such that it is axially displaceable and such that it can rotate.

FIG. 5 shows a second variant of a high-voltage circuit breaker 100. The high-voltage circuit breaker 100 has a modified interrupter unit 101. The interrupter unit 101 also has a first current path section 108 and a second current path section 109. The first current path section 108 and the second current path section 109 are mounted such that they can rotate, as known from the previous examples. In addition, the first current path section 108 and the second current path section 109 are also axially displaceable independently of one another. This makes it possible to displace the first connection contact 115, arranged on the first current path section 108, and the second connection contact 116, arranged on the second current path section 109, along the main axis of the interrupter unit 101 as well. As a result, the option for making contact with the connection contacts 115, 116 is extended. It is now possible to arrange a large number of stationary mating contacts in several planes radially around the interrupter unit 101. When a rotary movement and an axial movement are superimposed, the connection contacts can also be moved on a helical movement path. Furthermore, provision may be made for a plurality of connection contacts 115, 116 to be arranged on at least one of the current path sections 108, 109, with the result that it is possible to produce a relatively high number of circuit variants. In this case, provision may further be made for the mating contacts to provide for a move-in direction, for example, also in an axial or inclined direction, with the result that it is possible to make contact only given a specific rotary movement and/or axial movement of the interrupter unit 101 or of the first current path section 108 or of the second current path section 109. A rotary movement can be produced—as known from FIG. 1—via separate drives. However, provision may also be made for a drive 117 to be provided for the axial displacement of the entire interrupter unit or else only one of the current path sections 109. For example, an axial displacement can be carried out via a spindle gear mechanism. At the same time, a rotary movement of the second current path section 109 could be forced via a corresponding link guide. Alternatively, provision may also be made for only one of these two movements to be transferred to the second current path section 109. Furthermore, provision may also be made for the drive rod 106, which is provided for driving the contact pieces of the interrupter unit 101, to be provided for transferring an axial movement to the entire interrupter unit 101 or to only the first current path section 108. Provision may thus be made, for example, in the case of a connection operation, for first a movement of the interrupter unit 101 or of the first current path section 108 to take place and then a movement of the contact pieces to occur. Furthermore, provision may also be made for the drive rod 106 to be designed such that it is caused to carry out a rotary movement. Via this rotary movement, for example, a rotary movement of the interrupter unit 101 or of the first current path section 108 can be produced. Furthermore, it is also possible, via the rotary movement, for an axial displacement of the interrupter unit 101 or of the first current path section 108 to take place.

We claim:

1. A circuit breaker, comprising:
an encapsulating housing;
an interrupter unit disposed within said encapsulating housing, said interrupter unit having first and second contact pieces movably disposed relative to one another and axially opposite one another;
said interrupter unit including first and second current path sections for supplying electrical current to said first and second contact pieces, respectively;
at least one of said current path sections of said interrupter unit being rotatably mounted and including a connection contact movable relative to a stationary mating contact when said at least one current path section is rotated; and
a drive device for rotating said at least one of said current path sections of said interrupter unit when said encapsulating housing is closed; and
wherein said first and second current path sections are jointly movable, and said first and second current path sections are movable independently of one another.

2. The circuit breaker according to claim 1, wherein said current path section is axially displaceable.

3. The circuit breaker according to claim 1, wherein said at least one rotatably mounted current path section is rotatably mounted about an axis of rotation running approximately parallel to an axial direction of the mutually opposite said contact pieces.

4. The circuit breaker according to claim 1, wherein said connection contact is a moving contact element of an isolating device and/or of a grounding switching device.

5. The circuit breaker according to claim 1, which comprises a common drive device for producing a relative movement of said first and second contact pieces and a movement of said at least one current path section.

6. The circuit breaker according to claim 1, wherein said first and the second current path sections are mounted with a substantially constant axial distance therebetween.

7. The circuit breaker according to claim 1, wherein said first and the second current path sections are mounted with a variable axial distance therebetween.

8. A circuit breaker, comprising:
an encapsulating housing;
an interrupter unit disposed within said encapsulating housing, said interrupter unit having first and second contact pieces movably disposed in a translatory motion relative to one another;
said interrupter unit including first and second current path sections for supplying electrical current to said first and second contact pieces, respectively;
said current path sections of said interrupter unit being rotatably mounted and each including at least one connection contact movable relative to a respective stationary mating contact when said current path sections are rotated; and
a drive device for rotating said current path sections of said interrupter unit inside the closed said encapsulating housing, said first and second current path sections being jointly movable, and said first and second current path sections being movable independently of one another.

* * * * *